April 26, 1949.　　　F. MILLER　　　2,468,339

DRIVEN UNIT LUBRICATING MEANS

Filed Jan. 8, 1945

INVENTOR.
Frank Miller,
BY
Attorney.

Patented Apr. 26, 1949

2,468,339

UNITED STATES PATENT OFFICE 2,468,339

DRIVEN UNIT LUBRICATING MEANS

Frank Miller, Chicago, Ill.

Application January 8, 1945, Serial No. 571,912

1 Claim. (Cl. 308—20)

My invention to be hereinafter described, resides in the provision of a driven member which is compact, and which may be packed with lubricant so as to require little, or practically no, attention, and which may be used intermediately in a transmission system between a prime mover and an ultimately driven member, or as an idler member in a conveyor system, or similar transmission arrangement.

An important object of my invention is to provide a compact driven unit of the aforementioned character, which is complete, and which may be made to be mobile, as well as portable, depending on the size manufactured, and which may be conveniently set up in connection with a transmission system requiring the minimum of millrighting and work of that nature usually attendant when such units are erected in connection with conveyor systems.

Another object of my invention is to provide a mechanism of the aforementioned character which may be packed with lubricant or grease so as to require practically little or no attention, and hence will operate smoothly.

Another object of my invention is to provide an idler unit which rotates about a shaft type of structure wherein the shaft is stationary.

A still further object of my invention is to provide an intermediately driven mechanism of the aforementioned character which may be used intermediately in a transmission system specially adapted for belt transmission or drive.

Another object of my invention is to provide an intermediately driven mechanism of the aforementioned character which is simple in construction, practical and efficient in its operation, and of such elemental construction as to permit manufacture thereof economically in quantity production.

Other features, objects and advantages inherent in my invention will become apparent from the arrangement and combinations of elements hereinafter set forth, as pointed out in the claim, and as depicted on the accompanying drawings, wherein like symbols are used to designate like parts, and in which Fig. 1 represents a perspective view of one form of my invention.

Fig. 2 is a longitudinal cross-sectional view thereof.

Fig. 3 is an end view thereof.

Referring to the form, generally, indicated in Figures 1, 2 and 3, the symbol 8, generally, designates the rotor structure of my invention, whereas 9, generally, designates a suitable support or stator therefor, the structure in this particular instance being an intermediate or driven unit or mechanism for belt drive purposes, or type of transmission.

The drum 15 is comprised of two crown pulley configurations 16 and 17 separated by a beaded section 18, or any other suitable partition means, such as grooves may be provided. The drum 15 is also provided with interior annular flanges 19 and 20 in order to act as locating portions for the flange-like structures 22 provided with the trunnion extensions comprised of a stepped formation beginning with the larger extension 23, emanating from the flange 22, and an intermediate reduced section 24 and the terminal still further reduced section 25 adapted to be held in place securely, within the confines of the cap elements 29 secured to the upright extensions 28 of the support, generally, designated 9 by virtue of cap screws 30 or other suitable means. The compartment 21 is empty.

The terminal portions 25 are securely held in place against rotation by virtue of the screws 31 which may be conically tipped so as to imbed themselves into a suitable indentation provided in the trunnion termini 25. The base support, generally designated 9, is comprised of a base section 26 being somewhat relieved in order to provide feet 27, and it is of U-shaped configuration providing the upright arms 28 which cooperatively associated with caps 29 maintain said trunnions 24 and 25 against rotation, thus causing the drum 15 to revolve thereabout. The reduced trunnion sections 24 and 25 provide, incidentally, suitable shoulders to facilitate assembly of the rotor unit or drum 15, which is in turn secured to flanges 12 provided with suitable recesses, the said flanges 12 being secured thereto by virtue of set screws 38. The said flanges 12 are provided with suitable recesses in order to receive the ball bearing structures comprised of inner races 32 and outer races 33 confining therebetween rotatably the ball-bearings proper. The flanges are further provided with recesses of substantially semi-circular cross-section 13 in order to house the seal packing means 14, whereas to the flanges 22, I secure an annular flange element 34 forming a recess between it and the flange 22 in order to receive the seal packing 35; thus the chambers 39 are provided, and access thereto is furnished by the pipe tapped openings which are sealed by the screw seating therein of the screw plugs 36 which may be removed and a suitable pressure lubricant fitting 37 inserted therein in order to receive the pressure gun for loading the compartments 39 with lubricant such as grease. The lubricant being confined within the compartments 39, escape thereof is prevented by virtue of the seal packings 14 and 35 respectively, thus a unit of this type requires little or no attention after installation, or perhaps, only after long periods of usage.

The drum 15 is provided with the two conical sections 16 and 17 so that the belts 10 and 11 may receive and redirect rotational movement therethru, acting as an intermediate driven unit to some ultimately driven unit not shown.

The unit is arranged so that it may be very readily assembled or dismantled for repair purposes, and it is adapted to furnish a compact driven unit which is constantly packed with lubrication being sealed against escape therefrom, and thus providing an ideal unit requiring little or no attention except perhaps after long periods of usage.

I believe the drawings and the foregoing disclosure indicate rather succintly the nature and construction of my invention, and I hereby reserve all modifications and improvements of which it is susceptible, especially those coming within the purview of the foregoing description, the accompanying drawings, and the features and advantages to be attained thereby.

Having thus described and revealed my invention, what I claim as novel and desire to secure by Letters Patent, is:

A compact driven unit comprising, a stator including, a base having two upright support arms, flanged elements provided with stub shaft extensions rigidly secured to the said upright support arms, and seal means secured to the peripheries of the flanges of the said flanged elements; and a rotor including, a drum, drum flanges secured to each end of said drum, the said drum flanges provided with bearing means rotatably secured to the said stub shaft extensions, and further provided with seal means fitted over the said stub shaft extensions, the said drum being rotatably operative about the flanges of the said flanged elements, the said first-mentioned seal means in conjunction with the said second-mentioned seal means defining compartments adapted to retain a volume of lubricant, and means on the said drum flanges providing access to the said compartments permitting lubricant under pressure to be packed and retained therein, the said drum being provided with internal annular flanges acting as a locating abutment for the said flanged elements.

FRANK MILLER.

REFERENCES CITED

The following references are of record in the file of this patent:

UNITED STATES PATENTS

| Number | Name | Date |
|---|---|---|
| 1,286,343 | Kendall | Dec. 3, 1918 |
| 1,669,952 | Strong | May 15, 1928 |
| 1,740,475 | Murdoch | Dec. 24, 1929 |
| 1,748,247 | Scribner | Feb. 25, 1930 |
| 2,074,901 | Gotthardt | Mar. 23, 1937 |